United States Patent
Langhorst et al.

(10) Patent No.: US 12,111,456 B2
(45) Date of Patent: Oct. 8, 2024

(54) METHODS AND APPARATUS FOR OPTIMISED INTERFEROMETRIC SCATTERING MICROSCOPY

(71) Applicants: REFEYN LTD, Oxford (GB); Oxford University Innovation Limited, Oxford (GB)

(72) Inventors: Matthias Karl Franz Langhorst, Oxford (GB); Daniel Richard Cole, Oxford (GB); David John Lehar Graham, Oxford (GB); Philipp Kukura, Oxford (GB); Lee Priest, Oxford (GB)

(73) Assignees: Refeyn Ltd, Oxford (GB); Oxford University Innovation Limited, Oxford (GB)

( * ) Notice: Subject to any disclaimer, the term of this patent is extended or adjusted under 35 U.S.C. 154(b) by 78 days.

(21) Appl. No.: 17/767,274

(22) PCT Filed: Oct. 9, 2020

(86) PCT No.: PCT/GB2020/052522
§ 371 (c)(1),
(2) Date: Apr. 7, 2022

(87) PCT Pub. No.: WO2021/069921
PCT Pub. Date: Apr. 15, 2021

(65) Prior Publication Data
US 2022/0365329 A1    Nov. 17, 2022

(30) Foreign Application Priority Data
Oct. 10, 2019 (GB) ..................... 1914669

(51) Int. Cl.
*G02B 21/36* (2006.01)
*G02B 21/14* (2006.01)
(Continued)

(52) U.S. Cl.
CPC ............. *G02B 21/14* (2013.01); *G02B 21/18* (2013.01); *G02B 21/361* (2013.01); *H04N 23/72* (2023.01)

(58) Field of Classification Search
CPC ...... G02B 21/14; G02B 21/18; G02B 21/361; G02B 21/367; G02B 21/0092;
(Continued)

(56) References Cited

U.S. PATENT DOCUMENTS 8,705,040 B2    4/2014   Trainer
10,775,597 B2 *  9/2020  Kukura .................. G02B 21/14
(Continued)

FOREIGN PATENT DOCUMENTS

JP    H0416801 A      1/1992
JP    2000-249816 A   9/2000
(Continued)

OTHER PUBLICATIONS

Andrecka et al., "Direct observation and control of supported lipid bilayer formation with interferometric scattering microscopy," ACS Nano. 7(12):10662-10670 (2013).
(Continued)

*Primary Examiner* — Jonathan M Hansen
(74) *Attorney, Agent, or Firm* — Clark & Elbing LLP; Susan M. Michaud

(57) ABSTRACT

The application discloses a method and apparatus for imaging a sample by interferometric scattering microscopy, the method comprising illuminating a sample with at least one coherent light source, the sample being held at a sample location comprising an interface having a refractive index change, illuminating the sample with illuminating radiation to generate a backpropagating signal from the sample comprising light reflected at the interface and light scattered by the sample, splitting the backpropagating signal into first
(Continued)

and second signals, modifying the second signal using a modifying element such that the second signal differs from the first signal, directing the first and second signals onto first and second detectors to generate, respectively, first and second images and comparing, by a processor, the first and second images to determine one or more characteristics of the sample.

17 Claims, 7 Drawing Sheets

(51) Int. Cl.
    *G02B 21/18*     (2006.01)
    *H04N 23/72*     (2023.01)
(58) Field of Classification Search
    CPC ........ G02B 21/36; H04N 23/72; G01N 21/45; G01N 21/01; G01N 21/47; G01N 21/00
    See application file for complete search history.

(56) References Cited

U.S. PATENT DOCUMENTS

| | | |
|---|---|---|
| 2003/0058530 A1 | 3/2003 | Kawano |
| 2004/0170618 A1 | 9/2004 | Davis et al. |
| 2004/0178356 A1* | 9/2004 | Natori ............... G02B 21/0076 250/458.1 |
| 2005/0105097 A1 | 5/2005 | Fang-Yen et al. |
| 2006/0024722 A1 | 2/2006 | Fischer-Colbrie et al. |
| 2006/0127010 A1 | 6/2006 | Allen |
| 2007/0195330 A1 | 8/2007 | Ohashi et al. |
| 2009/0109527 A1 | 4/2009 | Sasaki et al. |
| 2009/0323056 A1 | 12/2009 | Yun et al. |
| 2011/0134521 A1 | 6/2011 | Truong et al. |
| 2012/0188358 A1 | 7/2012 | Kimura |
| 2013/0130307 A1 | 5/2013 | Sugiyama et al. |
| 2014/0210983 A1 | 7/2014 | Shimura et al. |
| 2014/0374575 A1 | 12/2014 | Takesue et al. |
| 2015/0103352 A1 | 4/2015 | Matsuzaki et al. |
| 2018/0329189 A1* | 11/2018 | Banna ............... G02B 21/0032 |
| 2019/0004299 A1* | 1/2019 | Kukura ............... G02B 21/008 |
| 2020/0386975 A1* | 12/2020 | Kukura ............... G02B 21/008 |
| 2023/0359009 A1* | 11/2023 | Kukura ............... G02B 21/36 |

FOREIGN PATENT DOCUMENTS

| | | |
|---|---|---|
| JP | 2003-098439 A | 4/2003 |
| JP | 2012-150301 A | 8/2012 |
| JP | 2013-044879 A | 3/2013 |
| JP | 2015-075340 A | 4/2015 |
| JP | 2015-096943 A | 5/2015 |
| JP | 2019-520612 A | 7/2019 |
| WO | WO-02/10831 A2 | 2/2002 |
| WO | WO-2004/072695 A2 | 8/2004 |
| WO | WO-2011/132586 A1 | 10/2011 |
| WO | WO-2015/059682 A1 | 4/2015 |
| WO | WO-2018/011591 A1 | 1/2018 |
| WO | WO-2018/019934 A1 | 2/2018 |

OTHER PUBLICATIONS

International Search Report and Written Opinion dated Dec. 22, 2020, for PCT International Application No. PCT/GB2020/052522, Kukura et al., "Methods and Apparatus for Optimised Interferometric Scattering Microscopy," filed Oct. 9, 2020 (11 pages).
Ortega Arroyo et al., "Interferometric scattering microscopy and its combination with single-molecule fluorescence imaging," Nat Protoc. 11(4):617-633 (2016).
Benford et al., "Phase Contrast Microscopy for Opaque Specimens," J. Opt. Soc. Am. 40(5):314-6 (1950).
Cole et al., "Label-Free Single-Molecule Imaging with Numerical-Aperture-Shaped Interferometric Scattering Microscopy," ACS Photonics. 4(2):211-6 (Jan. 2017).
Jacobsen et al., "Interferometric optical detection and tracking of very small gold nanoparticles at a water-glass interface," Opt Express. 14(1):405-14 (2006).
Kukura et al., "High-speed nanoscopic tracking of the position and orientation of a single virus," Nat Methods. 6(12):923-7 (2009) (8 pages).
Liebel et al., "Ultrasensitive Label-Free Nanosensing and High-Speed Tracking of Single Proteins," Nano Lett. 17(2):1277-1281 (2017).
Lipson et al., "12.4 Applications of the Abbe theory: Spatial filtering" In: "Optical Physics," Cambridge University Press, UK, XP055312812, ISBN: 978-0-521-49345-1 pp. 425-438, p. 426, last five lines of penultimate paragraph; figures 12.17(a), 12.27 Jan. 1, 2011 (Jan. 1, 2011).
Ortega-Arroyo et al., "Interferometric scattering microscopy (iSCAT): new frontiers in ultrafast and ultrasensitive optical microscopy," Phys Chem Chem Phys. 14(45):15625-36 (2012) (13 pages).
Piliarik et al., "Direct optical sensing of single unlabelled proteins and super-resolution imaging of their binding sites," Nat Commun. 5:4495 (2014) (8 pages).
Pluta, "Chapter 5. Phase Contrast Microscopy & Chapter 6. Amplitude Contrast, Dark-Field, and Other Related Techniques" In: "Advanced Light Microscopy," PWN-Polish Scientific Publishers, Elsevier, Poland, XP055313917, ISBN: 978-0-444-98918-5, pp. 3, 10-12, 22, 30, 75, 110, and 111, Jan. 1, 1989 (Jan. 1, 1989).
Santamaria et al., "Noise-free contrast improvement with a low frequency polarizing filter: a practical evaluation," Appl Opt. 16(6):1513-20 (1977).
Sarafis, "Phase Imagining in Plant Cells and Tissues," Biomedical Optical Phase Microscopy and Nanoscopy, edited by Zeev Zalevsky, pp. 53-68 (2013).
English translation of Office Action dated Apr. 23, 2024 for Japanese Patent Application No. 2022-521213, Langhorst et al., "Methods and Apparatus for Optimised Interferometric Scattering Microscopy," filed Oct. 9, 2020 (3 pages).

* cited by examiner

METHODS AND APPARATUS FOR OPTIMISED INTERFEROMETRIC SCATTERING MICROSCOPY

FIELD

The present invention relates to methods and apparatus for optimised interferometric scattering microscopy (referred to herein as iSCAT).

BACKGROUND iSCAT has materialized as a powerful approach to both single particle tracking with unique spatiotemporal resolution and label-free sensitivity down to the single molecule level.

iSCAT is disclosed, for example in Kukura et al., "High-speed nanoscopic tracking of the position and orientation of a single virus", Nature Methods 2009 6:923-935, and in Ortega Arroyo et al. "Interferometric scattering microscopy (iSCAT): new frontiers in ultrafast and ultrasensitive optical microscopy", Physical Chemistry Chemical Physics 2012 14:15625-15636.

Despite considerable potential, widespread application of iSCAT has been limited by the requirement for custom-built microscopes, unconventional cameras and complex sample illumination, limiting that capabilities of iSCAT for the robust and accurate detection, imaging and characterisation of objects as small as single molecules.

In our previous patent, WO 2018/011591, we disclosed an interferometric scattering microscope comprising a novel, contrast-enhancing spatial mask configured to improve the relative amplitudes of reference and scattered light fields. The microscope described therein is capable of achieving sensitivity similar to that of conventional iSCAT techniques, but with a drastic reduction in the complexity and expense of implementation, to the extent that a conventional microscope could be configured perform iSCAT by simple modification and inclusion of the spatial mask.

However, a number of limitations to the measurement sensitivity attainable using that approach have become apparent to the inventors of the present application.

Firstly, background fluctuations in the illumination, for example due to laser noise or other interference phenomena, often cannot be removed due to the chance that those fluctuations carry information about the sample under interrogation. Such background signatures thus limit detection sensitivity.

Secondly, the intensity of light with which a sample under interrogation can be illuminated is limited by detector characteristics including full well capacity and readout speed.

Accordingly, at higher illumination intensities, a stronger spatial mask must be used to reduce the amount of light arriving at the detector limiting the mass range and making the instrument more sensitive to external influences.

Thirdly, only a single measurement of sample interactions or events can be obtained for the same instant in time with such a microscope, thus no correlations can be derived through particle detection algorithms for single molecule events.

Finally, in applications where the apparatus is used for sample mass detection (mass photometry), the dynamic range of the measurement is limited by the chosen strength of the spatial mask. That is, it is necessary to optimise the apparatus for either high mass or low mass detection.

The present invention provides methods and apparatus for optimised iSCAT techniques which address each of the above-mentioned limitations. The methods disclosed herein approach these limitations by manipulating the image signal on the detection side of the apparatus after a portion of the illuminating light has been scattered by the sample.

SUMMARY OF INVENTION

According to an aspect of the present invention, a method of imaging a sample by interferometric scattering microscopy is provided.

The method comprises illuminating a sample with at least one coherent light source, the sample being held at a sample location comprising an interface having a refractive index change, illuminating the sample with illuminating radiation to generate a backpropagating signal from the sample comprising light reflected at the interface and light scattered by the sample, splitting the backpropagating signal into first and second signals, modifying the second signal using a modifying element such that the second signal differs from the first signal, directing the first and second signals onto first and second detectors to generate, respectively, first and second images and comparing, by a processor, the first and second images to determine one or more characteristics of the sample.

An optional spatial filter is configured to effect a reduction in intensity on incident radiation, the reduction in intensity being greater within a predetermined numerical aperture. Thus the spatial filter selectively reduces the intensity of the illuminating light over scattered light, taking advantage of the mismatch between the numerical aperture of reflected illuminating light and of light scattered from objects in a sample at the sample location. Thus, the spatial filter takes advantage of the different directionalities of these two sources of light. The reflected illuminating light will typically have a relatively small numerical aperture, whereas sub-diffraction-sized objects near a surface of the sample scatter light preferentially into high numerical apertures. Therefore, the reduction in intensity by the spatial filter at low numerical apertures predominantly affects the illuminating light and has a minimal effect on the scattered light, thereby maximising the imaging contrast.

Numerous advantages are provided by splitting the backpropagating signal, which allows for two images of the sample from the same instant in time to be captured, and thus in turn allows the sample to be investigated without temporally-dependent intensity fluctuations such as inconsistencies in the illuminating light source as introduced by sequential image acquisitions.

Properties of the sample, such as the mass of the sample in a mass photometry experiment, can also be investigated by independently modifying one of the two split signals before it arrives at the detector. This can also be done to remove background noise signatures, increasing measurement sensitivity.

In some embodiments, the at least one coherent light source comprises a first laser and a second laser, the beams of which are combined prior to illumination of the sample. Providing multiple light sources leads to a higher photon flux on the sample, and thus makes it more practical to beam split the reflected signal into two signals each of which contain enough information to independently form an image of the sample.

In some embodiments, splitting the signal comprises splitting the backpropagating signal into two signals having orthogonal polarizations. Separating the image channel into two orthogonal polarizations allows for birefringent properties of the sample to be investigated.

In some embodiments, splitting the signal comprises splitting the backpropagating signal into two signals having different optical power. Separating the image channel into two signals having different optical power enables different balances between reference beam and scattered light form the sample to be achieved.

In some embodiments, passing at least one of the first and second signals through a spatial filter comprises passing the first signal through a first spatial filter and modifying the second signal such that it differs from the first signal comprises passing the second signal through a second spatial filter wherein the first spatial filter and the second spatial filter are each configured to effect a reduction in intensity on incident radiation, the reduction in intensity being greater within a predetermined numerical aperture, wherein the first signal has a greater optical power than the second signal and wherein the second spatial filter applies a greater reduction in intensity to incident radiation than the first spatial filter. The first spatial filter and the second spatial filter may each be configured to effect a reduction in intensity on incident radiation, the reduction in intensity being greater within a predetermined numerical aperture. The first signal may have a greater optical power than the second signal and the second spatial filter may apply a greater reduction in intensity to incident radiation than the first spatial filter.

Using previous setups, the use of a single "catch-all" spatial filter limited the dynamic range of measurement, forcing the apparatus to be optimized either for high mass or for low mass. A high strength mask optimizes image capture of particles having low molecular weight, whereas for particles having a high molecular weight a weak mask or even no mask can be sufficient. Splitting the reflected signal into two signals of different intensity (e.g. 90:10) and applying spatial filters of appropriate strengths (e.g. 0.1% and 1%) to each signal allows a broader spectrum of mass to be interrogated by having one split arm optimised for low mass and another split arm optimised for high mass.

In some embodiments, directing the first and second signals onto first and second detectors comprises adjusting the phase of the second signal with respect to the first signal. Adjusting the phase of the second signal with respect to the first signal may comprise passing the second signal through a phase shift mask and/or passing the second signal through an imaging lens at an appropriate location along the optical path of the second signal. The second signal may be adjusted with respect to the first signal by half a wavelength of the illuminating radiation.

Some fluctuations in the sample illumination (for example, due to reflectivity changes in the system, buffer contributions, secondary reflections, laser noise and other interference phenomena) could not be removed in previous setups. Such background signatures limit the ability to remove noise from the setup, since it is not known whether the fluctuations are noise or due to the scattered light form the sample.

By independently adjusting the phase of the first or second signals, and comparing the two simultaneously generated (advantageous as specified in relation to claim 1) images, it is possible to highlight fluctuations which are uncorrelated in the two images and classify them as not originating from the image plane.

Doing so provides a second measurement result for correlating images of single molecule events, which in previous setups could only be processed using single measurements per instant in time, meaning correlations were difficult or not possible to derive.

In some embodiments, modifying the second signal comprises passing the second signal through an optical element configured to apply asymmetric magnification to the second signal along a first dimension corresponding to an x-dimension of a pixel grid of the first detector. In some embodiments the first signal may be passed through an optical element configured to apply asymmetric magnification to the first signal along a second dimension, the second direction being orthogonal to the first direction and corresponding to a y-dimension of a pixel grid of the second detector.

The amount of light that could be used in previous setups was limited by digital camera readout, necessitating the use of a stronger spatial filter, which in turn leads to increased sensitivity to vibrations and broadening of the recorded mass distributions in mass photometry. By splitting the signal into two and performing a one dimensional magnification in each of the x and y dimensions on the respective signals, the camera receives the same number of photons in the same or a larger number of pixels, which more importantly can be arranged in a way to optimize read-out speed. This equates to a capacity for processing a higher flux of detected photons without increasing digital camera readout speed.

In some embodiments, the at least one coherent light source is configured to provide illuminating light having at least two distinct interrogating wavelength; and splitting the signal comprises splitting the signal by wavelength, such that light having a first interrogating wavelength is directed to the first detector and light having a second interrogating wavelength is directed to the second detector.

Measuring the same sample with two different probing wavelengths can help to identify measurement changes caused by imperfect components of the optical system, or which are due to the sample absorbing at one wavelength but not at another (e.g. due to a fluorescence tag or a different dye added to the sample which would affect the scattering or due to absorption of one wavelength on a coating on the sample carrier).

In some embodiments the predetermined numerical aperture is identical or similar to the numerical aperture of the illuminating light reflected from the sample location in the backpropagating signal. This maximises the image contrast effect provided by the spatial filter.

In some embodiments modifying the second signal comprises phase shifting, magnifying in a first direction or spatial filtering with a greater intensity than the spatial filtering applied to the first signal.

According to another aspect of the present invention, an interferometric scattering microscope is provided which is configured to carry out the method of any preceding claim. The microscope comprises a sample location comprising a reflective surface, at least one coherent light source configured to illuminate the sample location, first and second detectors, a beam splitter configured to split a backpropagating signal from the sample location into first and second signals and a modifying element configured to modify the second signal such that it differs from the first signal wherein the system is configured to direct the first and second signals onto the first and second detectors, respectively.

In some embodiments the interferometric scattering microscope comprises at least one spatial filter positioned to filter at least one of the first signal and the second signal, wherein the spatial filter is configured affect a reduction in intensity on incident radiation that is greater within a predetermined numerical aperture.

The present invention may be applied with advantage to a sample comprising objects having a scattering cross section with respect to the illuminating light of $10^{-15}$ $m^2$ or less.

Typically such objects may also have a scattering cross section with respect to the illuminating light of $10^{-26}$ m² or more, i.e. within a range from $10^{-15}$ m² from $10^{-26}$ m². Examples of objects that may be studied include proteins or small aggregates thereof as well as metallic, organic or inorganic nanoparticles.

In order to image objects that are very weak scatterers, the spatial filter is arranged to pass output light with a reduction in intensity within the predetermined numerical aperture to $10^{-2}$ of the incident intensity or less. Typically, the spatial filter may be arranged to pass output light with a reduction in intensity within the predetermined numerical aperture to $10^{-4}$ of the incident intensity or more, for example in the range from $10^{-2}$ to $10^{-4}$ of the incident intensity.

FIGURES

To allow better understanding, embodiments of the present invention will now be described by way of non-limitative example with reference to the accompanying drawings, in which.

Figure 6A:
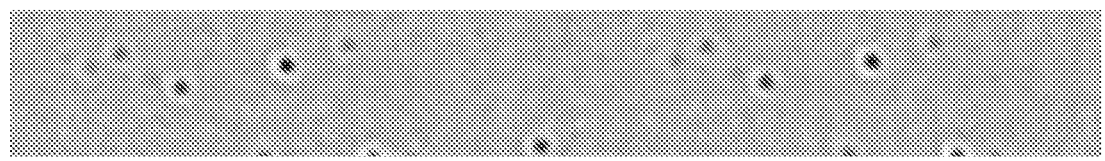
Figure 6B:
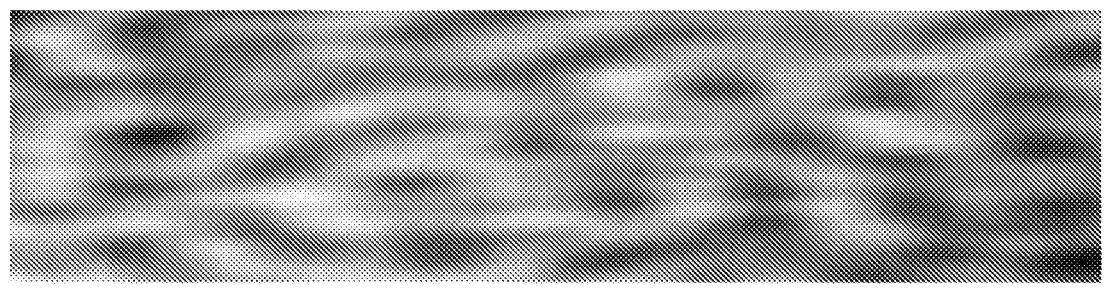
Figure 6C:
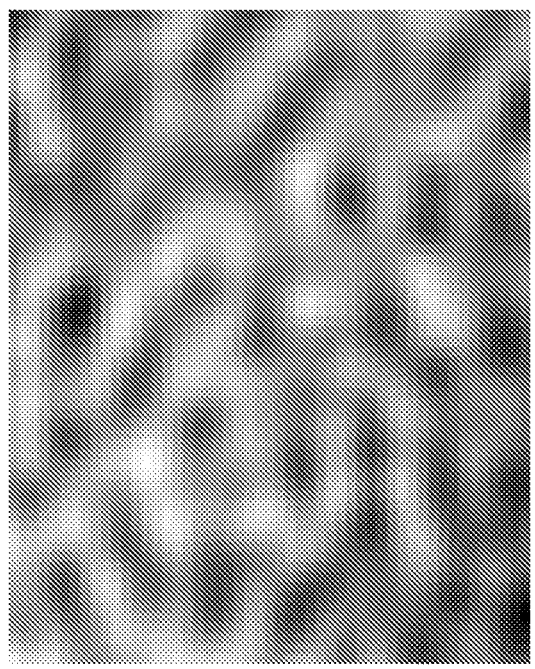

FIGS. 6A, 6B, and 6C show experimental results obtained using methods and apparatus according to the present invention.

DETAILED DESCRIPTION

In the systems and methods described herein, the light used may be: ultraviolet light (which may be defined herein as having wavelengths in the range from 10 nm to 380 nm); visible light (which may be defined herein as having wavelengths in the range from 380 nm to 740 nm); infrared light (which may be defined herein as having wavelengths in the range from 740 nm to 300 μm). The light may be a mixture of wavelengths. Herein, the terms 'optical' and 'optics' are used to refer generally to the light to which the methods are applied.

Figure 1:
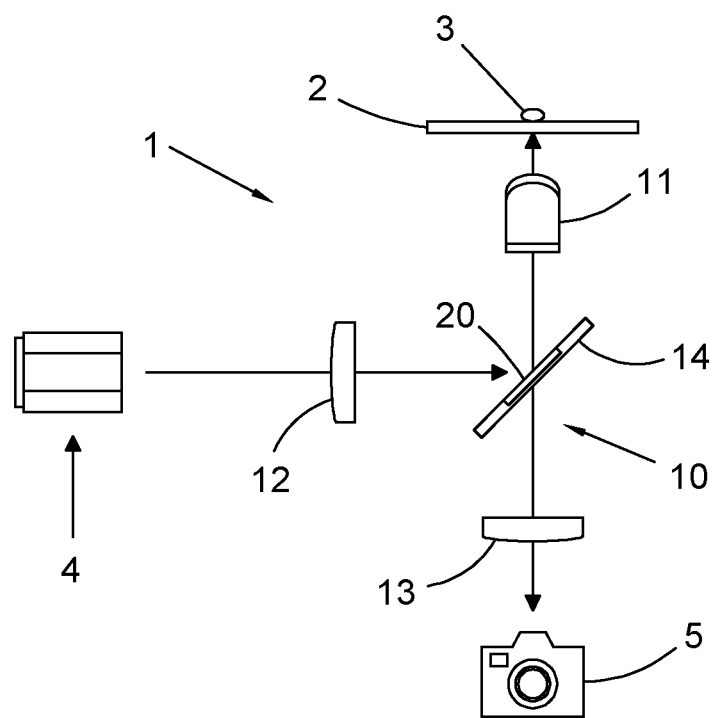
FIG. 1 is a schematic diagram of an iSCAT microscope of the prior art.
Figure 2:
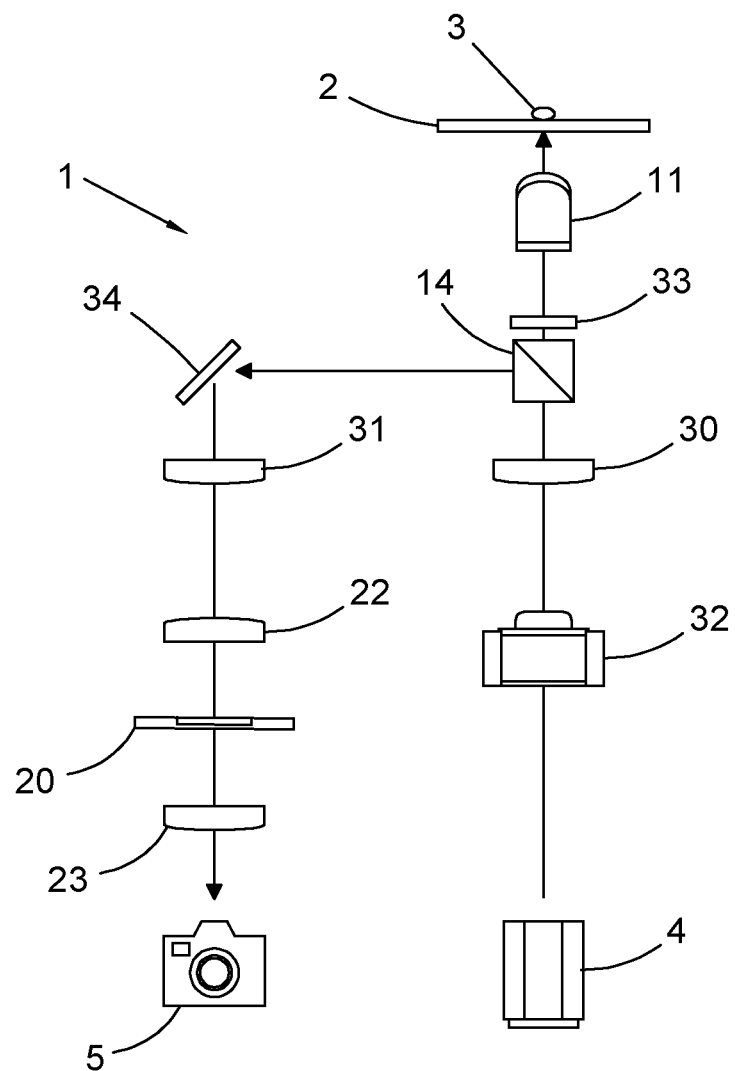
FIG. 2 is a schematic diagram of a modified iSCAT microscopes of the prior art.

FIG. 1 and FIG. 2 illustrate iSCAT microscope configurations disclosed in WO 2018/011591 which have a number of structural features and functionalities in common with the apparatus and methods of the present invention.

The disclosure of WO 2018/011591 is incorporated herein by reference, however for completeness the following description will set out the components and functionalities of the iSCAT microscope of the present invention which are in common with those of WO 2018/011591 and which are shown in FIG. 1 and FIG. 2, then describe the various improvements to said configurations provided by the present disclosure and provide example embodiments thereof.

Thus, referring to FIG. 1, the microscope 1 comprises a sample holder 2 for holding a sample 3 at a sample location. The sample 3 may be a liquid sample comprising objects to be imaged, which are described in more detail below. The sample holder 2 may take any form suitable for holding the sample 3. Typically, the sample holder 2 holds the sample 3 on a surface, which forms an interface between the sample holder 2 and the sample 3. For example, the sample holder 2 may be a coverslip and/or may be made from glass. The sample 3 may be provided on the sample holder 2 in a straightforward manner, for example using a micropipette.

The microscope 1 further comprises an illumination source 4 and a detector 5. The illumination source 4 is arranged to provide illuminating light. The illuminating light may be coherent light. For example, the illumination source 4 may be a laser. The wavelength of the illuminating light may be selected in dependence on the nature of the sample 3 and/or the properties to be examined. In one example, the illuminating light has a wavelength of 405 nm.

Optionally, the illumination light may be modulated spatially to remove speckle patterns that arise from the coherent nature of the illumination and laser noise, for example as detailed in Kukura et al., "High-speed nanoscopic tracking of the position and orientation of a single virus", Nature Methods 2009 6:923-935.

The detector 5 receives output light in reflection from the sample location. The illuminating light that reaches the detector is reflected predominantly from a surface of the sample, typically an interface between the sample and the sample holder, thereby providing interference with objects in the sample close to that surface.

A relatively small amount, typically only 0.5%, of the illumination light is reflected in examples where a glass-water interface is used, while a significantly higher amount, typically greater than 90%, of light scattered by a nanoscopic object at the interface, is scattered back towards the illumination direction. This intrinsically improves the ratio between scattered and reflected light fields more than 1000-fold compared to transmission-type geometries, resulting in a larger interferometric contrast. As a result, three orders of magnitude fewer photons need to be detected to achieve the same nominal signal-to-noise given a specific scatterer, illumination intensity, and exposure time, than for transmission-type setups.

Typically, the microscope 1 may operate in a wide-field mode, in which case the detector 5 may be an image sensor that captures an image of the sample 3. The microscope 1 may alternatively operate in a confocal mode, in which case the detector 5 may be an image sensor or may be a point-like detector, such as a photo-diode, in which case a scanning arrangement may be used to scan a region of the sample 3 to build up an image. Examples of image sensors that may be employed as the detector 5 include a CMOS (complementary metal-oxide semiconductor) image sensor or a CCD (charge-coupled device).

The microscope 1 further comprises an optical system 10 arranged between the sample holder 2, the illumination source 4 and the detector 5. The optical system 10 is arranged as follows to direct illuminating light onto the sample location for illuminating the sample 3, and to collect output light in reflection from the sample location and to direct the output light to the detector 5.

The optical system 10 includes an objective lens 11 which is a lens system disposed in front of the sample holder 2. The optical system 10 also includes a condenser lens 12 and a tube lens 13. The condenser lens 12 condenses illuminating light from the light source 11 (shown by continuous lines in FIG. 1) through the objective lens 11 onto the sample 3 at the sample location.

The objective lens 11 collects the output light which comprises both (a) illuminating light reflected from the sample location (shown by continuous lines in FIG. 1), and (b) light scattered from the sample 3 at the sample location (shown by dotted lines in FIG. 1). The reflected light is predominantly reflected from the interface between the sample holder 2 and the sample 3.

Typically, this is a relatively weak reflection, for example a glass-water reflection. For example, the intensity of the reflected illuminating light may be of the order of 0.5% of the intensity of the incident illuminating light. The scattered light is scattered by objects in the sample 3. Scattered light from objects at or close to the surface of the sample constructively interfere with the reflected light and so are visible in the image captured by the detector 5.

As shown in FIG. 1, the reflected illuminating light and the scattered light have different directionalities. In particular, the reflected illuminating light has a numerical aperture resulting from the geometry of the beam of light output by the light source 4 and the optical system 6. The scattered light is scattered over a large range of angles and so fills larger numerical aperture than the reflected illuminating light. The tube lens 13 focuses the output light from the objective lens 11 onto the detector 5.

The optical system 10 also includes a beam splitter 14 that is arranged to split the optical paths for the illuminating light from the light source 4 and the output light directed to the detector 5. The beam splitter 14 may have a conventional construction that provides partial reflection and partial transmission of light incident thereon.

In the examples of the present disclosure, the light source 4 is offset from the optical path of the objective lens 11 so that the illuminating light from the light source 4 is reflected by the beam splitter 14 into the objective lens 11, and conversely the detector 5 is aligned with the optical path of the objective lens 11 so that the output light from the sample location is transmitted through the beam splitter 14 towards the detector 5.

In addition to the components described above that may be of a conventional construction, the microscope 1 includes a spatial mask or filter 20. In the example of FIG. 1, the spatial filter 20 is formed on the beam splitter 14 and is thereby positioned behind the back aperture of the objective lens 11, and so directly behind the back focal plane 15 of the objective lens 11, however the spatial filter 20 may be placed on other points along the optical path of the iSCAT microscope to achieve the same effect as described below.

The spatial filter 20 is positioned to filter the backpropagating output light passing from the sample holder interface to the detector 5. In the examples of the present disclosure in which the detector 5 is aligned with an optical path of the objective lens 11, the spatial filter 20 is therefore transmissive.

The spatial filter 20 is partially transmissive and therefore passes the output light, which includes the reflected illumination light, but with a reduction in intensity. The spatial filter 20 is also aligned with the optical axis and has a predetermined aperture so that it provides a reduction in intensity within a predetermined numerical aperture. Herein, numerical aperture is defined in its normal manner as being a dimensionless quantity characterising a range of angles with respect to the sample location from which the output light originates.

Specifically, the numerical aperture NA may be defined by the equation: $NA = n \cdot \sin(\theta)$, where $\theta$ is the half angle of collection and n is the refractive index of the material through which the output light passes (for example the material of the components of the optical system 10).

The spatial filter 20 may be formed in any suitable manner, typically comprising a layer of deposited material. The material may be, for example, a metal such as silver. In some embodiments, the spatial filter may comprise one or more dielectric coatings. In some embodiments, the spatial filter may be formed so as to be partially reflective to incident radiation within a given range of angles. The deposition may be performed using any suitable technique.

As sub-diffraction sized objects near an interface scatter light preferentially into a larger numerical aperture than the reflected illuminating light, the reduction in intensity provided by the spatial filter 20 preferentially reduces the intensity in detection of the reflected illuminating light over the scattered light. Accordingly, the reduction in intensity by the spatial filter 20 at low numerical apertures predominantly affects the reflected illuminating light and has a minimal effect on the scattered light, thereby maximising the contrast in the capture image. The enhanced imaging contrast enables high contrast detection of objects that are weak scatterers.

The contrast enhancement may be understood as follows. As the spatial filter 20 passes part of the output light in the predetermined numerical aperture (i.e. is partially transmissive in this example), fractions of illuminating light and scattered light fields reach the detector and interfere for a sufficiently coherent illumination source. The light intensity reaching the detector $I_{det}$ is then given by:

$$I_{det} = |E_{inc}|^2 \{r^2 t^2 + |s|^2 + 2rt|s|\cos \Phi\},$$

where $E_{inc}$ is the incident light field, $r^2$ is the reflectivity of the interface and $t^2$ is the transmissivity of the spatial filter 20, s is the scattering amplitude of the object, and $\Phi$ is the phase difference between transmitted illuminating light and the scattered light.

The additional filtering provided by the spatial filter 20 enables the amplitude of the reference field to be tuned directly through selection of the transmissivity $t^2$ of the spatial filter 20, as opposed to being fixed by the reflectivity of a glass-water interface as in standard iSCAT. In the case that the spatial filter 20 is a layer of deposited material, the transmissivity $t^2$ may be selected by choice of the material and/or thickness of the layer.

Such tuning may be performed according to, for example, the scattering object of interest, the camera full well capacity, and magnification.

Brightfield illumination ensures that the strongest unwanted back-reflections, usually originating from the objective, are directed away from the detector 5, minimising imaging background and enabling large fields of view without complex scanning of the beam of illuminating light.

In order to image objects that are relatively weak scatterers, the spatial filter 20 may be arranged to pass reflected illuminating light with a reduction in intensity within the predetermined numerical aperture to an intensity in the range from $10^{-2}$ to $10^{-4}$ of the incident intensity (in this context, the intensity of the output light that is incident on the spatial filter 20).

For example, a sample comprising objects having a mass of 5000 kDa or less may be imaged. Typically, the disclosed techniques may be applied to a sample comprising objects having a mass of 10 kDa or more, for example objects having a mass within a range from 10 kDa to 5000 kDa, and/or to a sample comprising objects having a scattering cross section with respect to the illuminating light of $10^{-12}$ m$^2$ or less, or more preferably $10^{-17}$ m$^2$ or less. Typically such objects may also have a scattering cross section with respect to the illuminating light, for example, within a range from $10^{-17}$ m$^2$ from $10^{-26}$ m$^2$. Examples of objects to which the techniques of the present disclosure may be applied to image include proteins or small aggregates thereof, or their binding partners.

In order to simultaneously image stronger scatterers, the transmissivity of the second filter can be set to anywhere between 1 and $10^{-2}$, depending on the desired detection range.

Referring to FIG. 2, a second example configuration of microscope 1 is illustrated. The configuration of FIG. 2 is also disclosed in WO 2018/011591 and is similarly suitable for optimisation by application of the techniques of the present invention.

The configuration of FIG. 2 positions the spatial filter 20 at a conjugate focal plane 21 of the back focal plane of the objective lens 11, instead of being behind the back aperture of the objective lens 11. The conjugate focal plane 21 of the back focal plane 15 of the objective lens 11 is formed between a pair of telescope lenses 22 and 23 positioned behind the tube lens 13.

An acousto-optical deflector 32 is arranged after the light source 4 to provide scanning of the illuminating light. The acousto-optical deflector 32 may be operated to scan a region of the sample 3 to build up an image and/or to provide spatial modulation for removing speckle patterns that arise from the coherent nature of the illumination and laser noise, as mentioned above.

The condenser lens 12 is replaced by a pair of telecentric lenses 30 and 31 that perform the function of imaging any modifications to the beam path at the acousto-optical deflector 32 into the back focal plane of the imaging objective.

The positions of the light source 4 and the detector 5 are reversed with respect to the configuration of FIG. 1 so that the illuminating light from the light source 4 is transmitted through the beam splitter 14 into the objective lens 11, and conversely the output light from the sample location is reflected by the beam splitter 14 towards the detector 5.

The beam splitter 14 is a polarising beam splitter and a quarter wave plate 33 is arranged between the beam splitter 14 and the sample 3, so that the beam splitter 14 splits the light. A mirror 34 is arranged to deflect the output light reflected by the beam splitter 14.

Figure 3A:
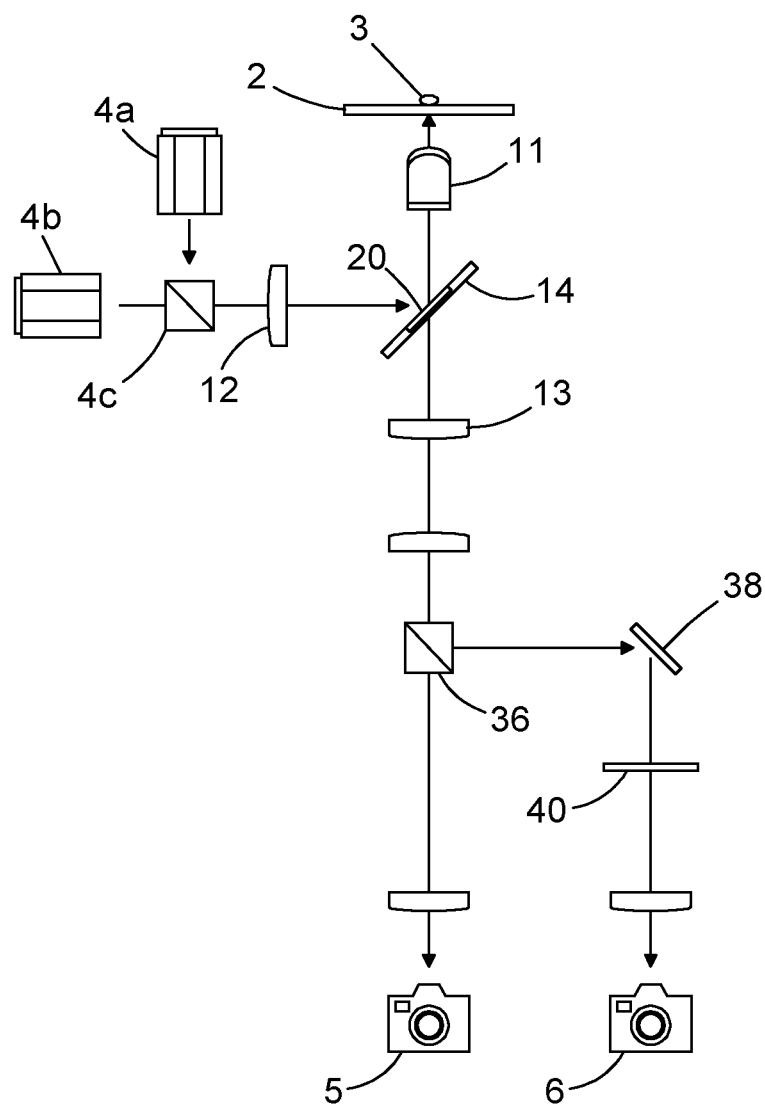
FIGS. 3a, 3b, 4 and 5 illustrate exemplary embodiments of an iSCAT microscope according to the present invention.
Figure 3B:
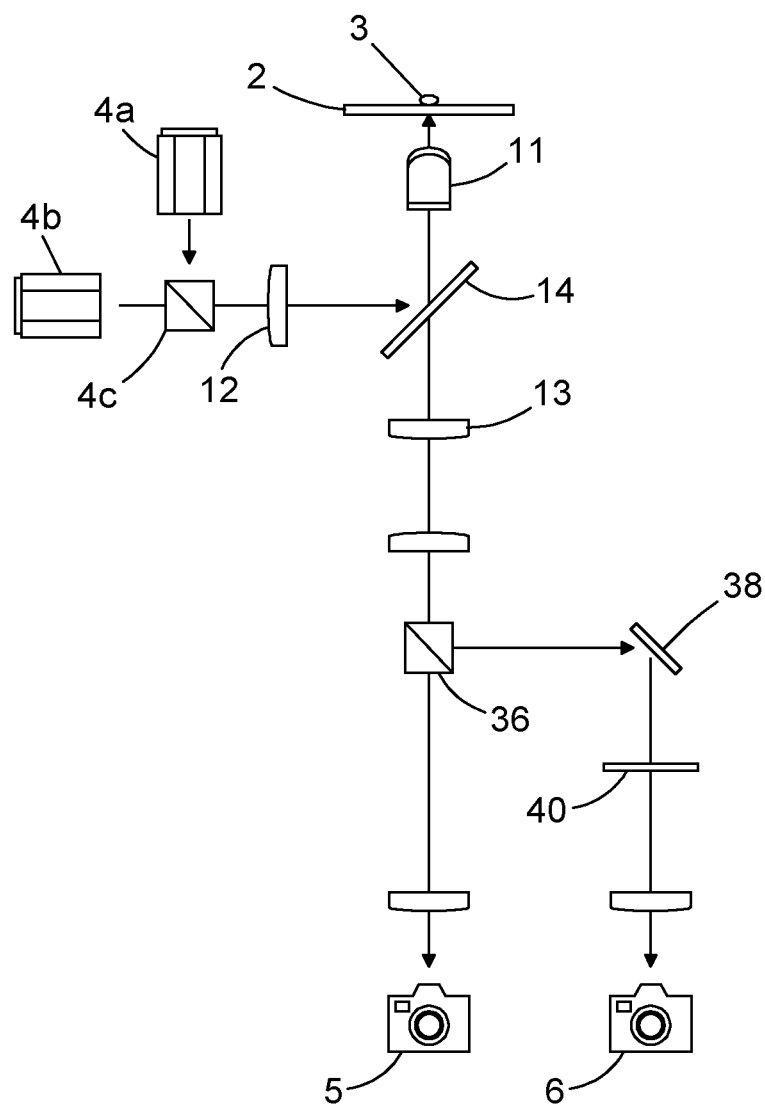
Figure 4:
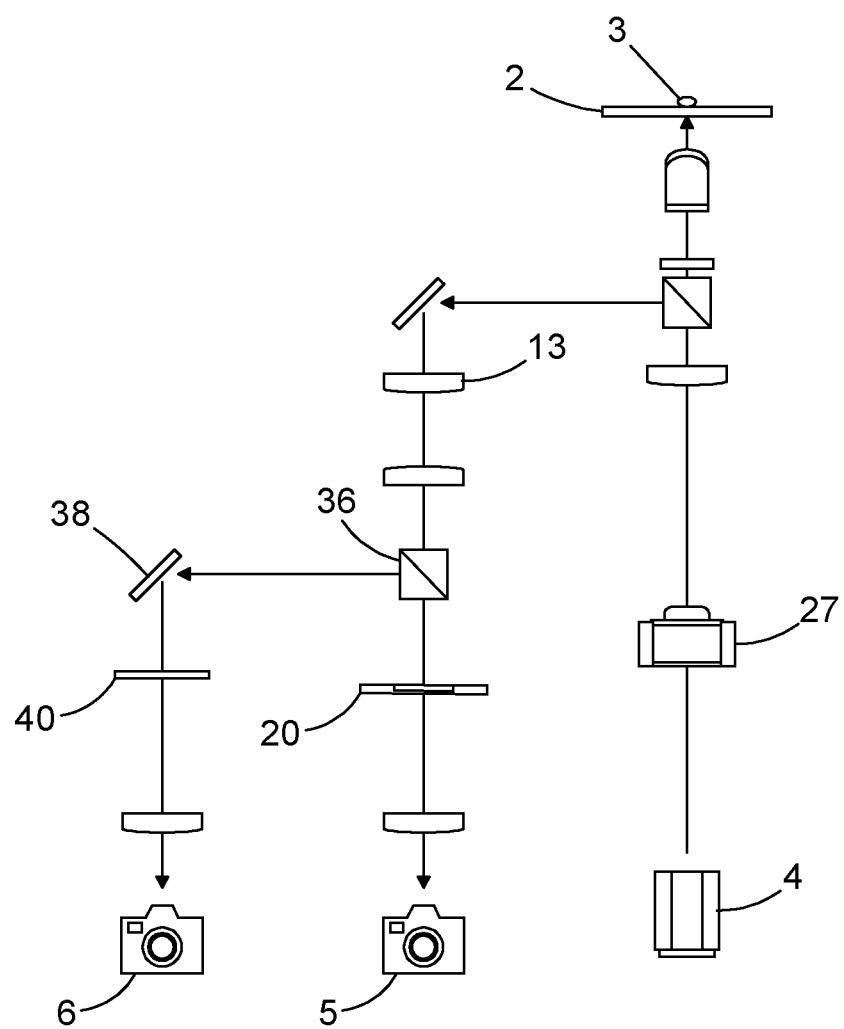
Figure 5:
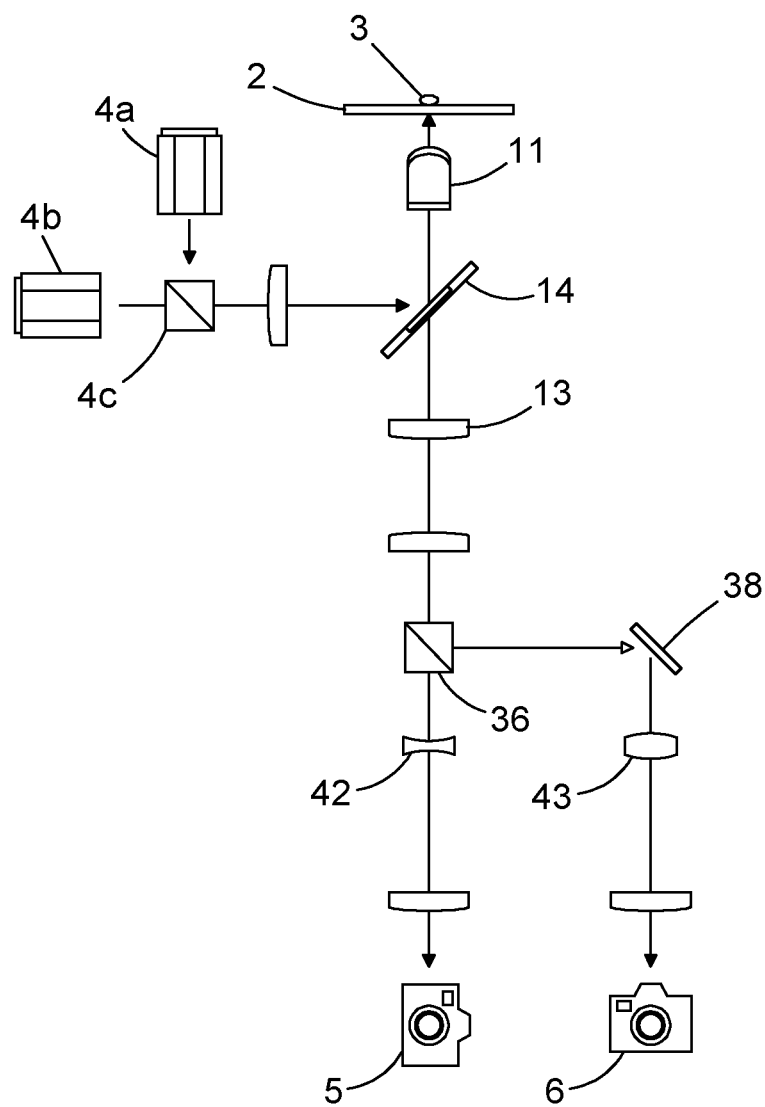

Now, referring to FIGS. 3-5, the following description focuses on various improvements provided by the present invention to the above-described configurations of iSCAT microscope 1.

Use of the spatial filter 20 does not fundamentally alter the sensitivity limits or SNR (signal to noise ratio) achievable for a given object, incident light intensity, and exposure time, however the sensitivity can be increased by manipulation of the backpropagating signal on the detection side of the apparatus after a portion of the illuminating light has been scattered by the object.

In the example configurations illustrated in FIGS. 3-5, the backpropagating signal is manipulated by passing it through a second beam-splitter 36 configured to split the backpropagating signal into first and second signals, which are then directed, respectively, to first and second detectors 5 and 6. In this manner, two separate image signals may be captured for a given object at the same instant in time, and processed through separate image channels. This in turn allows light scattered by a sample to be investigated through image comparison without introducing temporally-dependent intensity fluctuations from the illumination source or changes in the optical system 10.

Furthermore, by independently modifying at least one of the two split signals from beam splitter 36 before they arrive at the detectors, additional properties of a sample can be investigated and the sensitivity of measurement can be increased. For example, background noise signatures can be removed from the illumination, and the first and second signals can be tuned relative to each other and combined to provide more information on a sample, as will be explained below.

Beam splitter 36 is configured to split the backpropagating signal in a manner dependent on which properties of the sample/backpropagating signal are under investigation.

For example, in some embodiments where it is desirable to split the signal by optical power, beam splitter 36 may comprise a plate, provided with a film, which may be metallic or dielectric, arranged at 45° to the optical paths. Alternatively, the beam splitter 36 may be a cube beam splitter formed by a matched pair of prisms having a partially reflective film at the interface between the prisms.

In some embodiments, the beam splitter 36 is a polarising beam splitter, used in combination with a quarter wave plate between the beam splitter 36 and the sample 3, and is configured to split the backpropagating signal into orthogonally polarised first and second signals. Such a configuration allows analysis of birefringent properties of a sample by detectors 5 and 6.

In some embodiments, the illuminating light comprises at least two distinct interrogating wavelengths for illuminating the sample and beam splitter 36 is configured to split the backpropagating signal by wavelength, such that light having a first interrogating wavelength is directed to the first detector 5 and light having a second interrogating wavelength is directed to the second detector 6.

Measuring the same sample with two different probing wavelengths can help to identify changes in intensity caused by wavelength dependent components in the optical system. Such a configuration can also identify changes in intensity caused by the sample absorbing light at one wavelength but not the other, e.g. due to a fluorescence tag or to a different dye added to the sample which would affect the scattering, or due to absorption of one wavelength on a coating on the sample carrier.

The methods of optimisation described herein are complementary, and may be used separately or in combination with one another. Accordingly, in some embodiments beam splitter 36 may comprise multiple beam splitters, each configured to split the signal in a different or the same manner so that the backpropagating signal is split into three or more signals, each of which may then be directed to a separate detector.

Referring to FIG. 3a, an example optimised configuration of microscope 1 is illustrated which is based on the optical configuration of FIG. 1.

In addition to the optical components of FIG. 1, the configuration of FIG. 3a includes a second detector 6 and second beam splitter 36 which is located along the optical path of the backpropagating signal between tube lens 13 and the detectors 5 and 6, and which is configured to split the backpropagating signal into first and second signals.

In the illustrated example, the first signal passes directly to detector 5, whereas the second signal is directed via a reflective element 38 through a signal modifying element 40, before impinging on the second detector 6. The signal modifying element 40 is chosen according to the type of image signal optimisation that is desired.

In one example optimisation approach, beam splitter 36 splits the backpropagating signal into first and second signals having equal optical power, and modifying element 40 comprises a retarding mask configured to phase shift the light scattered by an object held at the sample location by $\pi/2$ in the second signal without affecting the phase of the illuminating light. In doing so, the image of the sample in the second signal is inverted, causing scattered light which would otherwise interfere constructively to interfere destructively.

As the scattered light in the first signal is not phase shifted the scattered light interferes constructively as in conventional iSCAT. Thus, when the images acquired by detectors 5 and 6 are compared, the intensity fluctuations in the images which are caused by scattering from the sample will be correlated, and intensity fluctuations which are not correlated between the two images can be identified and attributed to background signatures such as, for example, imperfections in the illuminating light.

Identification of such background signatures in iSCAT images, obtained by independent "phase tuning" of the scattered light in the split signals, allows the signatures to be removed and therefore improves the sensitivity of microscope 1.

In an alternative example, the phase of the scattered light is inverted instead by having signal modifying element 40 comprise an imaging lens, and moving said imaging lens to an appropriate point along the optical path of the second split signal between the second beam splitter 36 and second detector 6. Such a configuration enables the same "tuning" effect on the phase of the scattered light as provided by a phase shift mask. This is due to the unfocused nature of the illuminating light from illumination source 4 and the highly focused nature of the light scattered by a sub-diffraction limit sized sample 3. This effect can be understood as explained below.

If a collimated light beam is focused to a single point in space by a perfect lens/focusing element, the phase of the beam, measured on the other side of the focal point at a distance equal to the focal length of the focusing element, will have incurred a phase shift of n. At exactly the point of focus, the phase shift will be $\pi/2$. This phase shift is called the Guy phase shift, and has an approximately linear dependence on distance from the focal point.

In practice, no focusing element is capable of focusing a beam to a single point in space, and the strength of the phase change to distance dependence for a given light beam is based on on how well focused that beam is. Weakly focused light, such as the illuminating light from the illumination source 4, is hardly affected by the Guy phase shift. In contrast, single molecules or very small samples such as those under interrogation by the iSCAT microscope of the present disclosure, have sizes under the diffraction limit of the illuminating light, and therefore act as near-perfect focusing element. As such, the scattered light in the backpropagating signal will have a high Guy phase dependence along its optical path, whereas the illuminating light will not.

In the case of an iSCAT microscope, both the scattered light and the reflected illuminating light undergo additional phase changes due to the refractive index change at the sample location interface/coverslip before passing through beam splitter 36 and being imaged onto detectors 5 and 6. In this optical setup, varying the location of the imaging lens, which in this example is modifying element 40, enables tuning of the Guy phase shift of the scattered light without affecting the weakly focused illuminating light, emulating a change in distance from the focal point.

Accordingly, the phase of the scattered light can be changed without changing the phase of the illuminating light, and the image of the sample received by the detector 6 can be inverted as described in relation to the phase shift mask.

FIG. 3a depicts an arrangement in which there are two lasers 4a and 4b which are combined via a beam splitter 4c to form a more powerful illumination beam.

Although this embodiment is illustrated and described as an optimisation of the configuration of FIG. 1, it may also be implemented as an optimisation of the configuration of FIG. 2.

FIG. 3b depicts an alternative arrangement to FIG. 3a except there is no spatial filter 20. The beam is still split, with a modifying element 40 placed in the path of the second split signal. The modifying element may be a magnify, phase shift or even spatially filter the second split signal to increase the sensitivity of the apparatus Referring to FIG. 4, an example optimised configuration of microscope 1 is illustrated which is based on the optical configuration of FIG. 2.

In addition to the optical components of FIG. 2, the configuration of FIG. 4 includes a second detector 6 and second beam splitter 36 which is located along the optical path of the backpropagating signal between tube lens 13 and the detectors 5 and 6, and which is configured to split the backpropagating signal into first and second signals. In this configuration, one or more spatial filters 20 are located between beam splitter 36 and the detectors 5 and 6.

In the illustrated example, beam splitter 36 splits the backpropagating signal asymmetrically into first and second signals having different optical powers. The first signal passes through a first spatial filter 20 to detector 5, and the second signal is directed via a reflective element 38 through signal modifying element 40 which is a second spatial filter having a different strength to the first spatial filter, before impinging on the second detector 6.

In mass photometry experiments, where an iSCAT microscope is used to measure the mass of sub-diffraction limit objects held at the sample location, the image signal quality must usually be optimised for a given mass range, as weak scatterers require a higher optical power in the illumination and thus for more of the illuminating light to be attenuated by the spatial filter 20 than strong scatterers.

Splitting the backpropagating signal asymmetrically and passing the first and second signals through spatial filters having different strengths as described above enables first and second signals to be generated each of which have a different balance between illuminating light (reference beam) and light scattered from the sample in the image plane (image signal). Thus, first and second images can be acquired by detectors 5 and 6 each of which is optimised for either high mass object measurement or low mass object measurement. This increases the dynamic mass range measurable with microscope 1.

For example the beam splitter 36 may be configured such that the first signal has a greater optical power than the second signal, in which case the second spatial filter applies a greater reduction in intensity to incident radiation than the first spatial filter. The ratio of optical power between the first and second signal may be, for example, 90:10, in which case spatial filters of appropriate strengths, for example, attenuation to 0.1% and 1% respectively, will be used. This ratio can be adjusted depending on the desired detection range in either direction, for instance 99:1 with attenuation to 0.01 and 10%, respectively. Ideally, the combination of optical power ratio and attenuation is always chosen such as to maintain the same light intensity in both imaging channels.

FIG. 4 depicts an optional acousto-optical deflector (AOD) 27 in the path of the illumination beam. An acousto-optical deflector is arranged after the light source to provide scanning of the illuminating light. The acousto-optical deflector 27 may be operated to scan a region of the sample 3 to build up an image and/or to provide spatial modulation for removing speckle patterns that arise from the coherent nature of the illumination and laser noise, as mentioned above.

Although this embodiment is illustrated with reference to a configuration based on the configuration of FIG. 2, it should be recognised that this method of optimisation could equally well be implemented based on the configuration of FIG. 1.

Referring to FIG. 5, another example embodiment is illustrated which is based on the optical configuration of FIG. 1.

The amount of light that could be used in previous setups was limited by digital camera readout, necessitating the use of a stronger spatial filter 20, which in turn lead to increased sensitivity to vibrations and broadening of the recorded mass distributions in mass photometry.

Similarly to the configuration of FIG. 3, FIG. 5 includes a second detector 6 and second beam splitter 36 which is located along the optical path of the backpropagating signal between tube lens 13 and the detectors 5 and 6, and which is configured to split the backpropagating signal into first and second signals.

In this embodiment, however, instead of passing directly to detector 5, the first signal passes through a first magnifying element 42 configured to magnify the first signal along a first axis.

In the embodiment of FIG. 5, the second signal is directed via a reflective element 38 through signal modifying element, which in this case is a second magnifying element 43 configured to magnify the second signal along an axis perpendicular to the first axis.

Detector 5 and 6 are also oriented differently to each other. Conventional pixel-based detectors tend to have one electronic readout direction which is faster than the other due to the fact that pixel excitations are processed column by column on the grid. Accordingly, detectors 5 and 6 are oriented such that the direction along which the camera read out electronics are capable of processing pixel excitations fastest is aligned with the first axis for detector 5 and with the second axis for detector 6.

Using the above described configuration, it is possible to increase the rate at which photons scattered from the sample are processed without using expensive specialised detectors by improved matching of detected photons to digital camera readout operation. For example, detector 5 may readout only along a single X-axis column in which the first magnifying element 42 has magnified the photon flux from the first signal, and detector 6 may read out only along a single Y-axis column along which the second magnifying element 43 has magnified the photons flux from the second signal.

The pixels of detectors 5 and 6 can then be mapped against each other to properly assign X-Y locations to both cameras such that acquired images from detectors 5 and 6 can be blended together. In some cases it is necessary to correct the blended images for distortions. Overall, however, the above-described method allows conventional detectors to increase the rate at which images are captured by a number proportional to the magnification by the first and second magnifying elements with little loss in image quality.

Thus, the described embodiment compensates for the reduction in the total number of photons in the first and second signals due to the spatial filter 20 which, as can be seen from the equation for $I_{det}$ set out above, enhances the scattering contrast in acquired images at the expense of the total number of detected photons.

Although this embodiment is illustrated and described as an optimisation of the configuration of FIG. 1, it may also be implemented as an optimisation of the configuration of FIG. 2.

Additionally, in some implementations of the embodiment (not illustrated) only the first signal is passed through a magnifying element, whereas the second image channel is viewed in a normal spatial distribution. In such a configuration, the second signal may be passed through a different mask or a general intensity filter instead of a magnifying element. In such implementations the second channel maintains full spatial resolution and can be used for localization.

Each of the methods of optimisation described above in relation to FIGS. 3-5 may be used in combination with one another or independently.

Furthermore, as the backpropagating signal is split into first and second signals by beam splitter 36 with lower photon flux, each of the described methods of optimisation where may be facilitated by the provision of a higher intensity illumination source 4. In some embodiments, a higher intensity illumination source 4 is provided by combining the beams of first and second lasers as illustrated in FIG. 3.

Referring to FIG. 6A, an example experimental result which is a two channel mass photometry ratiometric image using one chip, shows two images of the same sample mixture obtained at the same point in time using a beam-splitting configuration similar to that of the iSCAT microscope of FIG. 5 described above, but with no magnifying elements.

Referring to FIG. 6B, another example experimental result is displayed showing an image obtained using another iSCAT microscope configuration similar to that of FIG. 5 including a magnifying element configured to stretch one of the split beams along a single dimension.

As can be seen in FIG. 6B, the image of a sample mixture has been magnified/stretched along the x-dimension.

Referring to FIG. 6C, the same experimental result as shown in FIG. 6B is displayed, but with the pixels in the stretched dimensions being recombined into one using 1-dimensional binning, proving that image content and resolution is not lost by this procedure, but simply spread the photons over multiple pixels which can then be recombined afterwards.

The microscope 1 may be used to perform iSCAT for a wide range of applications including single molecule detection. A particular application is label-free imaging of weak scatterers, where objects of interest have to be invariably detected on top of a large background, which reduces the imaging contrast. The microscope 1 may be used for a wide range of studies and measurements, for example to measure any changes in refractive index, which includes, for example: single molecule binding/unbinding, phase transitions, clustering, assembly/disassembly, aggregation, protein/protein interactions, protein/small molecule interactions, high-sensitivity label-free imaging.

Thus, there are numerous applications for the microscope 1, ranging from fundamental research to industrial applications, for example in the pharmaceutical industry. As an example, iSCAT is currently the world's most sensitive label-free single molecule imaging biosensor, which could have significant impact for example on the surface plasmon resonance sensing market. In addition, as described above microscope 1 can be used in mass measurement, functioning as an accurate, precise and highly resolved single molecule mass spectrometer in solution, with many applications in research and industry.

The invention claimed is:

1. A method of imaging a sample by interferometric scattering microscopy, the method comprising:
illuminating a sample with at least one coherent light source, the sample being held at a sample location comprising an interface having a refractive index change, illuminating the sample with illuminating radiation to generate a backpropagating signal from the sample comprising light reflected at the interface and light scattered by the sample;
splitting the backpropagating signal into first and second signals;
modifying the second signal using a modifying element such that the second signal differs from the first signal;
directing the first and second signals onto first and second detectors to generate, respectively, first and second images; and
comparing, by a processor, the first and second images to determine one or more characteristics of the sample.

2. The method according to claim 1 further comprising passing at least one of the first and the second signals through a spatial filter, the spatial filter being configured to effect a reduction in intensity on incident radiation, the reduction in intensity being greater within a predetermined numerical aperture.

3. The method of claim 1, wherein the at least one coherent light source comprises a first laser and a second laser, the beams of which are combined prior to illumination of the sample.

4. The method of claim 1, wherein splitting the signal comprises splitting the backpropagating signal into two signals having orthogonal polarizations.

5. The method of claim 1, wherein splitting the signal comprises splitting the backpropagating signal into two signals having different optical power.

6. The method of claim 5, wherein passing at least one of the first and second signals through a spatial filter comprises passing the first signal through a first spatial filter and modifying the second signal such that it differs from the first signal comprises passing the second signal through a second spatial filter wherein the first spatial filter and the second spatial filter are each configured to effect a reduction in intensity on incident radiation, the reduction in intensity being greater within a predetermined numerical aperture, wherein the first signal has a greater optical power than the second signal and wherein the second spatial filter applies a greater reduction in intensity to incident radiation than the first spatial filter.

7. The method of claim 1, wherein modifying the second signal comprises adjusting the phase of the second signal with respect to the first signal.

8. The method of claim 7, wherein adjusting the phase of the second signal with respect to the first signal comprises passing the second signal through a phase shift mask.

9. The method of either claim 7, wherein adjusting the second signal comprises passing the second signal through an imaging lens at an appropriate location along the optical path of the first signal.

10. The method of claim 7, wherein adjusting the phase of the second signal with respect to the first signal comprises adjusting the phase of the second signal with respect to the first signal by half a wavelength of the illuminating radiation.

11. The method of claim 1, wherein modifying the second signal comprises:
passing the second signal through an optical element configured to apply asymmetric magnification to the second signal along a first dimension corresponding to an x-dimension of a pixel grid of the second detector.

12. The method of claim 11, wherein the method further comprises: and
passing the first signal through an optical element configured to apply asymmetric magnification to the first signal along a second dimension, the second direction being orthogonal to the first direction and corresponding to a y-dimension of a pixel grid of the second detector.

13. The method of claim 1, wherein the at least one coherent light source is configured to provide illuminating light having at least two distinct interrogating wavelengths; and
wherein splitting the signal comprises splitting the signal by wavelength, such that light having a first interrogating wavelength is directed to the first detector and light having a second interrogating wavelength is directed to the second detector.

14. The method of claim 1, wherein the predetermined numerical aperture is identical or similar to the numerical aperture of the illuminating light reflected from the sample location.

15. The method of claim 1, wherein modifying the second signal comprises phase shifting, magnifying in a first direction or spatial filtering with a greater intensity than the spatial filtering applied to the first signal.

16. An interferometric scattering microscope configured to carry out the method of claim 1, comprising:
a sample location comprising a reflective surface;
at least one coherent light source configured to illuminate the sample location;
first and second detectors;
a beam splitter configured to split a backpropagating signal from the sample location into first and second signals; and
a modifying element configured to modify the second signal such that it differs from the first signal;
wherein the system is configured to direct the first and second signals onto the first and second detectors, respectively.

17. An interferometric scattering microscope according to claim 16 further comprising at least one spatial filter positioned to filter at least one of the first signal and the second signal, wherein the spatial filter is configured affect a reduction in intensity on incident radiation that is greater within a predetermined numerical aperture.

* * * * *

UNITED STATES PATENT AND TRADEMARK OFFICE
CERTIFICATE OF CORRECTION

| | |
|---|---|
| PATENT NO. | : 12,111,456 B2 |
| APPLICATION NO. | : 17/767274 |
| DATED | : October 8, 2024 |
| INVENTOR(S) | : Matthias Karl Franz Langhorst et al. |

It is certified that error appears in the above-identified patent and that said Letters Patent is hereby corrected as shown below:

In the Claims

Column 15, Claim 9, Line 54, replace "either claim" with --claim--;

Column 16, Claim 17, Line 54, replace "spatial filter is configured affect" with --spatial filter is configured to effect--.

Signed and Sealed this
Seventh Day of January, 2025

Derrick Brent
*Acting Director of the United States Patent and Trademark Office*